# 3,558,379
REINFORCING MATRICES WITH SILICA-SHEATHED SILICON CARBIDE FIBERS

Wallace W. Pultz, Painted Post, and Charles C. Smith, Jr., Corning, N.Y., assignors to Corning Glass Works, Corning, N.Y., a corporation of New York
No Drawing. Filed Dec. 21, 1967, Ser. No. 692,266
Int. Cl. B32b 25/02
U.S. Cl. 156—62.2      3 Claims

ABSTRACT OF THE DISCLOSURE

The invention relates to a method for improving the bonding of silica-sheathed, silicon carbide fibers to various matrices such as plastics and rubbers to thereby enhance the reinforcing action of these fibers upon the matrices. This improvement in bonding action is accomplished by subjecting the fibers to a high vacuum, e.g., less than about 100 microns of mercury, to remove adsorbed surface gases and expose very reactive surface portions. The matrix material can then chemically react with the active sites on the surface of the fibers such that very strong bonds are developed therebetween.

---

Much research effort has been undertaken in recent years to utilize fibrous materials as reinforcing elements for plastics, rubbers, glasses, and metals. It was well-recognized that fibers composed of crystals and, particularly, fibers consisting of a single crystal, exhibited extremely high strengths. A large proportion of the early work involved the use of glass fibers which, while not as intrinsicly strong as crystalline fibers, possessed the practical advantage of being readily produced. Some early efforts were also conducted employing asbestos fibers but the very recent discoveries of methods for economically producing highly refractory, very high strength crystalline fibers of such materials as alumina and silicon carbide have fostered new impetus to investigations relating to the use of fibers as reinforcing elements.

One principal problem forestalling the expected enormous increment in strength through the use of fibers as reinforcing elements has been the lack of bonding between the fiber and the material to be reinforced. Thus, although the fibers possess mechanical strengths many magnitudes greater than the matrices within which they are dispersed, this lack of bonding does not allow any substantial portion of the strength to be realized in the "reinforced" product. Hence, there has been a well-recognized need for a crystalline (or glass) fiber having a composition or surface character that would inherently render it available for strong bonding with various matrices, or some method for substantially improving the bonding properties of presently-known fibers. We have discovered that the surface of a particular type of fiber containing silicon carbide crystals when treated in accordance with the method of our invention will react chemically with a great variety of organic and inorganic materials and thereby develop bonding of tremendous strength.

U.S. Pat. No. 3,335,049 discloses the manufacture of submicroscopic-sized fibers consisting of a core portion of silicon carbide crystals with a surface sheath of silica. Such fibers are produced through vapor deposition resulting from the reaction of silica and carbon in an atmosphere containing carbon monoxide gas. The fibers, themselves, have diameters varying between about 50 to 350 A. and solution of the fibers in hydrofluoric acid has indicated a silica content between about 70–80% by weight. For a fuller discussion of the structure and manufacture of these silica-sheathed, silicon carbide fibers, reference is hereby directed to that patent.

As was indicated in that patent, the silica sheath imparted two advantages to the fibers. First, the fibers were readily dispersible in both polar and non-polar liquids and, second, the silica sheath appeared to promote a better bond between the fibers and the matrix to be reinforced. Nevertheless, with respect to the second advantage, the bond developed was a far cry from that which would enable the inherent strength of the fibers to be substantially utilized. We have discovered a method whereby this surface sheath can be made chemically reactive with various materials so that chemical bonding will take place therebetween.

In general terms, our invention comprises subjecting the submicroscopic-sized, silica-sheathed silicon carbide fibers disclosed in U.S. Pat. No. 3,335,049 to a substantial vacuum, viz., less than about 100 microns of mercury, for a sufficient length of time to remove adsorbed surface gases and expose extremely reactive surface portions. To the evacuated fibers is added a solvent which is compatible with the matrix to be reinforced or, if feasible, the matrix material itself.

Thus, after the fibers have been subjected to evacuation, the surfaces thereof will react chemically with the conventional organic solvents such as benzene, isobutanol, trichloroethylene, carbon tetrachloride, acetone, methanol, methylethyl ketone, naphthalene, etc. at room temperature. The bond established between the solvents and the fibers is so strong that heating such coated fibers at 165° C. for 20 minutes did not remove the coating. As further evidence of the strength and stability of this bond, fibers which had been subjected to evacuation were immersed in benzene at room temperature, dried for 15 minutes in air at 165° C., and then immersed in a container of water. The container was sealed and the fibers indicate no signs of being wetted by the water after a full year's contact therewith.

When water is added to a sample of fibers which had been previously evacuated and the fibers then dried in a vacuum at 165° C., no reaction occurs with the above-described organic solvents. This phenomenon again demonstrates that the reactive surface portions or active sites have been blocked, the water being very strongly adsorbed or having reacted chemically with the surface portions.

After their manufacture, the fibers can be exposed to air at ambient temperatures for long periods of time without eliminating the availability of the active sites, thereby indicating that they are protected by physically adsorbed gases. The vacuum treatment removes these adsorbed gases to permit chemical attack by the added solvents, including water.

Infrared spectrographic analyses have disclosed a very broad, low, perturbed OH band which contrasts sharply with the single, unperturbed peak commonly found for silica. The chemical bonding of the organic solvents to the fibers has also been observed through infrared spectroscopy.

The anomalous surface behavior of these fibers is believed to be attributable to the perturbing influences of the silicon carbide core. The effect of the core portion is probably influenced by the thickness of the silica sheath. The active sites may be perturbed OH groups or surface defects, e.g., some lower valence state of silicon in the silica network. In any event, it is believed that bonding is a function of these select sites and good bonding will only be achieved if the fiber is evacuated before any solvent addition.

In carrying out this invention on a laboratory scale, a pycnometer such as is employed for vacuum pycnometric density measurements may be utilized for evacuating the fibers. Thus, a charge of fibers is placed within the pycnometer, a vacuum of less than about 100 microns of mercury drawn therein, and this vacuum maintained for a sufficient length of time to substantially remove the adsorbed gases. Room temperatures are normally satisfactory for this evacuation although higher temperatures may be used, if desired. However, no particular advantage in speed of removal of the adsorbed gases has been observed in such practice. The time required to substantially eliminate the adsorbed gases generally varies about 2–10 minutes although much longer times can be used with no injury to the fibers. It will be apparent that the removal of adsorbed gases from a large sample of fibers will require more time than their removal from a small sample.

As has been pointed out above, one fundamental requirement for the reinforcement of various matrices by fibers is the development of a strong bonding between the fiber and the matrix. This bond strength and the area of the fibers over which it acts must be sufficient to transfer the shear load from the matrix to the fibers, if any substantial benefit in strength is to be imparted to the composite article from the intrinsic high strength of the fiber. Also, in order to reinforce a matrix, the strength and the modulus of elasticity of the fiber must be greater than those demonstrated by the matrix. In this way, if the fiber and the matrix are under equal strain, the fiber will assume the major portion of the load. These factors are demonstrably met in the following examples.

EXAMPLE I

One part by weight of fiber which has been subjected to a vacuum of about 50 microns of mercury for about two minutes at room temperature was treated with trimethoxymethylsilane, dried for 15 minutes in air at 165° C. and then hand blended into eight parts by weight of Jones-Dabney epoxy 510 resin until a smooth, uniform mixture was obtained, about five minutes. Two parts by weight of Jones-Dabney 841 catalyst were then hand blended for about two minutes into the mixture which was thereafter cured for one hour at 100° C. and one hour at 200° C.

EXAMPLE II

One part by weight of fiber which had been subjected to a vacuum of about 10 microns of mercury for about five minutes at room temperature was treated with two parts by weight of styrene. To this mixture about 0.5% by weight, based upon the total weight of the mixture, of benzoyl peroxide catalyst was admixed thereto and the mixture then cured for 15 hours at 80° C.

Example I illustrates a composite article wherein the surfaces of the fibers are reacted with an organic solvent which is compatible with a desired matrix, whereas Example II discloses a matrix which is itself reactive with the fibers. Surfaces of each of the fiber-containing composite articles described in Examples I and II which had been freshly fractured in flexure were examined employing electron microscopy. The great majority of the fibers observed at the fractured surfaces were broken adjacent to the line of fracture rather than being pulled out of the plastic matrix. This clearly illustrates that the bond developed between the matrix and the fiber was sufficiently strong to transfer the load from the matrix to the fiber. Where poor bonding is obtained, as with fibers not subjected to the evacuation treatment, the fibers are pulled out of the matrix when the composite article is broken in flexure. Thus, in that case, the fibers are stronger than the bond existing between the matrix and the fiber. However, where the matrix-fiber bond is stronger than the strength of the fiber, as in Examples I and II, the strength of the composite article is primarily governed by the inherent strength of the fibers in proportion to the percent by volume of fibers incorporated into the matrix.

We claim:
1. In the method for strengthening articles made from materials selected from the group consisting of plastics and rubbers by dispersing therein submicroscopic-sized, silica-sheathed silicon carbide fibers as reinforcing elements the improvement which comprises subjecting said fibers to a vacuum of less than about 100 microns of mercury for a period of time sufficient to substantially eliminate adsorbed gases therefrom prior to dispersing said fibers in said articles.

2. A method according to claim 1 wherein said time ranges between about 2–10 minutes.

3. A method according to claim 1 wherein said fibers after being subjected to vacuum are contacted with a solvent which is compatible with said plastics or rubbers prior to being dispersed in said articles.

References Cited
UNITED STATES PATENTS
3,335,049   8/1967   Pultz _____ 161—176

BENJAMIN A. BORCHELT, Primary Examiner

S. C. BENTLEY, Assistant Examiner

U.S. Cl. X.R.

117—61; 264—102